(12) United States Patent
Dudar (10) Patent No.: US 9,797,800 B2
(45) Date of Patent: Oct. 24, 2017

(54) SYSTEMS AND METHODS FOR EMISSIONS LEAK DETECTION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 14/742,268

(22) Filed: Jun. 17, 2015

(65) Prior Publication Data

US 2016/0370252 A1 Dec. 22, 2016

(51) Int. Cl.
*G01M 3/40* (2006.01)
*F02M 33/02* (2006.01)
*G01L 5/00* (2006.01)

(52) U.S. Cl.
CPC ............ *G01M 3/40* (2013.01); *G01L 5/0028* (2013.01)

(58) Field of Classification Search
CPC .. G01M 3/00; G01M 3/40; G01L 5/00; G01L 5/0028; F02M 33/00; F02M 33/02; F02M 33/08
See application file for complete search history.

(56) References Cited

U.S. PATENT DOCUMENTS

| 5,275,144 | A | 1/1994 | Gross | |
|---|---|---|---|---|
| 8,950,265 | B2 | 2/2015 | Dunn et al. | |
| 2001/0018845 | A1* | 9/2001 | Roberts | F17D 5/06 73/40 |
| 2009/0115433 | A1* | 5/2009 | Bier | G01M 3/18 324/693 |
| 2014/0000742 | A1* | 1/2014 | Betsinger | F16L 57/06 138/36 |
| 2014/0251284 | A1 | 9/2014 | Plymale et al. | |
| 2016/0097690 | A1* | 4/2016 | Landmann | G01L 9/025 73/706 |

* cited by examiner

*Primary Examiner* — Nguyen Ha
(74) *Attorney, Agent, or Firm* — James Dottavio; McCoy Russell LLP (57) ABSTRACT

Methods and systems are provided for detecting leaks in an emissions control system of a vehicle. In one example, a method comprises monitoring an equivalent resistance of a leak detection circuit, and indicating a leak responsive to the equivalent resistance not equal to a threshold resistance. In this way, leaks in vapor line interfaces can be easily detected and located, thereby reducing emissions, without intrusively testing the emissions control system.

19 Claims, 7 Drawing Sheets

SYSTEMS AND METHODS FOR EMISSIONS LEAK DETECTION

FIELD

The present description relates generally to methods and systems for detecting leaks in emissions control systems.

BACKGROUND/SUMMARY

Vehicle emissions control systems may be configured to store fuel vapors from fuel tank refueling and diurnal engine operations, and then purge the stored vapors during a subsequent engine operation. In an effort to meet stringent emissions regulations, emissions control systems may need to be intermittently diagnosed for the presence of leaks that could release fuel vapors to the atmosphere.

Some leak test methods include evacuating the emissions control system and testing whether the vacuum level is maintained, while other methods include pressurizing the emissions control system and determining whether the pressure level remains steady. Some of these known leak test methods can pinpoint the location of leaks in addition to detecting the existence of a leak.

However, the methods described above are typically limited to locating leaks in particular components of the emissions control system, such as valves. In some instances, leaks may occur in the vapor lines which couple the components of the emissions control system. For example, vapor lines typically include "quick connect" (QC) interfaces which easily snap together and lock in place, thereby improving serviceability of the emissions control system. If the quick connect interfaces are not properly snapped in and locked, or are snapped in and not locked, then leaks will occur. In the presence of such leaks, known diagnostics methods only indicate the existence of a leak, and are incapable of indicating the location of the leak.

When a diagnostic light comes on responsive to a failed leak test, the driver brings the vehicle to an automotive repair garage. There, in order to determine the location of the leak, a technician or mechanic may perform a smoke test with a smoke test apparatus. The smoke test apparatus generates smoke which fills the emissions control system and leaks out of the leak. The technician then identifies the location of the leak by observing the smoke exiting the leak. In the case of an improperly secured quick connect causing the leak, the technician can then properly snap in and lock the quick connect to stop the leak.

While smoke tests are effective, they are also intrusive to the emissions control system, time consuming, and expensive. Furthermore, if the leak is caused by an improperly secured quick connect, a smoke test may be an unsuitable approach.

In one example, the issues described above may be addressed by a method comprising monitoring an equivalent resistance of a leak detection circuit, and indicating a leak responsive to the equivalent resistance not equal to a threshold resistance. In this way, leaks in vapor line interfaces can be easily detected and located without intrusively testing the emissions control system.

In another example, a connector assembly comprises: a first connector comprising a housing defining a protruded portion and a first interface; a second connector comprising a housing defining a cavity and a second interface, the second connector matable with the first connector wherein the cavity receives the protruded portion and the first interface contacts the second interface; an electrical force-sensing element positioned on and substantially covering one of the first interface and the second interface; and an electrical resistor integrally formed in the housing and electrically coupled in series to electrical ground and to the electrical force-sensing element. In this way, the connector assembly, when used to connect vapor lines to components of an emissions control system, can provide a unique signal to indicate whether the connector is securely fastened.

In yet another example, an evaporative emissions system comprises at least two quick-connect interfaces configured to couple together elements of the evaporative emissions system, each quick-connect interface comprising a force-sensing element configured to output a unique signal upon forming a seal. In this way, particular connections with leaks may be detected and fixed, thereby reducing emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
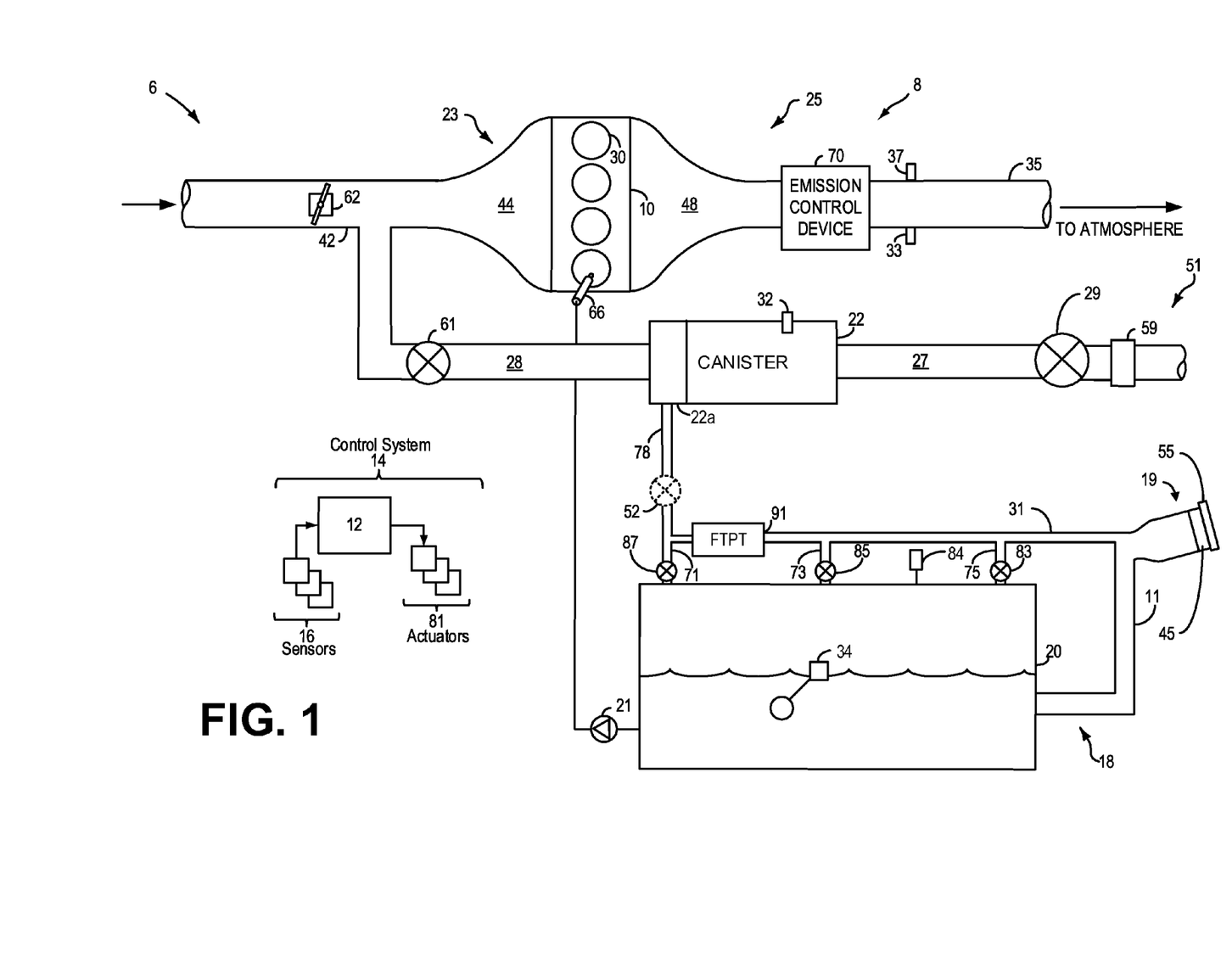
FIG. 1 shows a schematic depiction of an engine fuel system.
Figure 2:
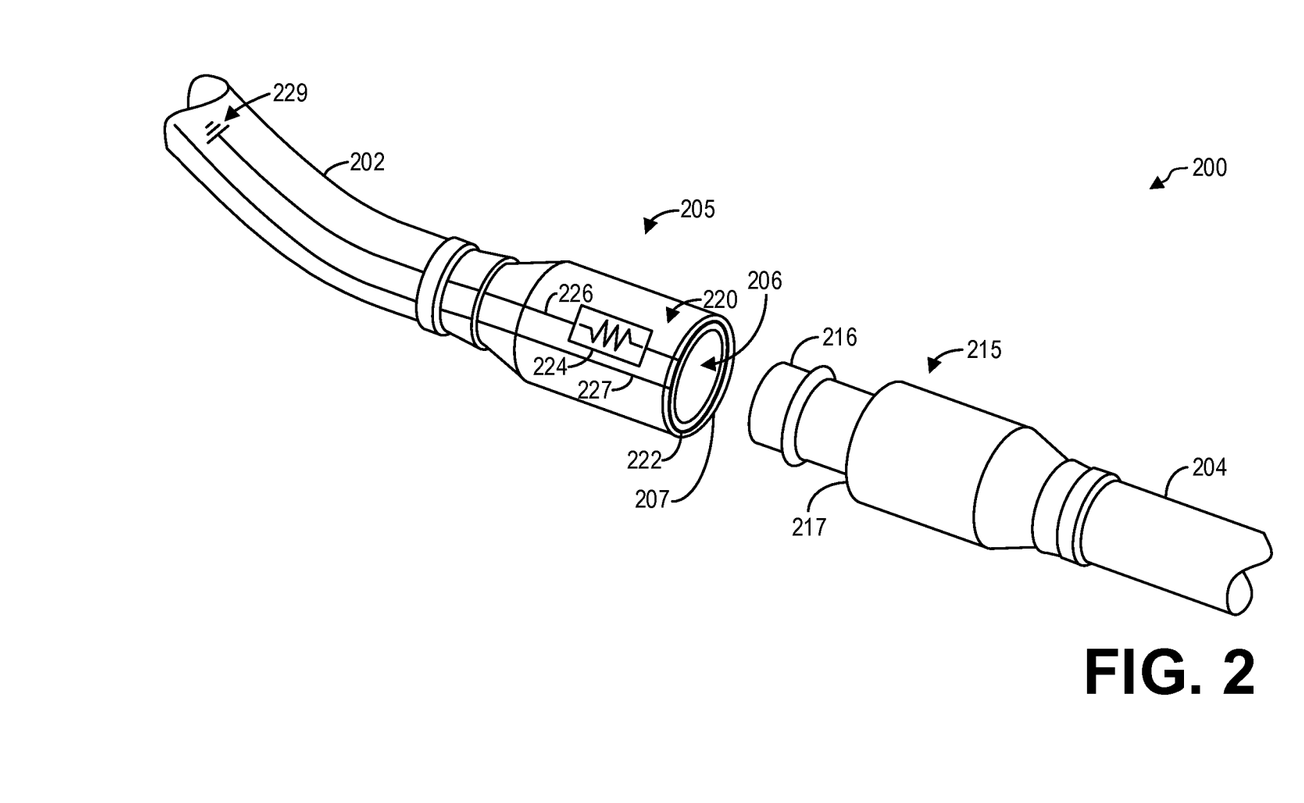
FIG. 2 shows a perspective illustration of example line connections including force-sensing elements.
Figure 6:
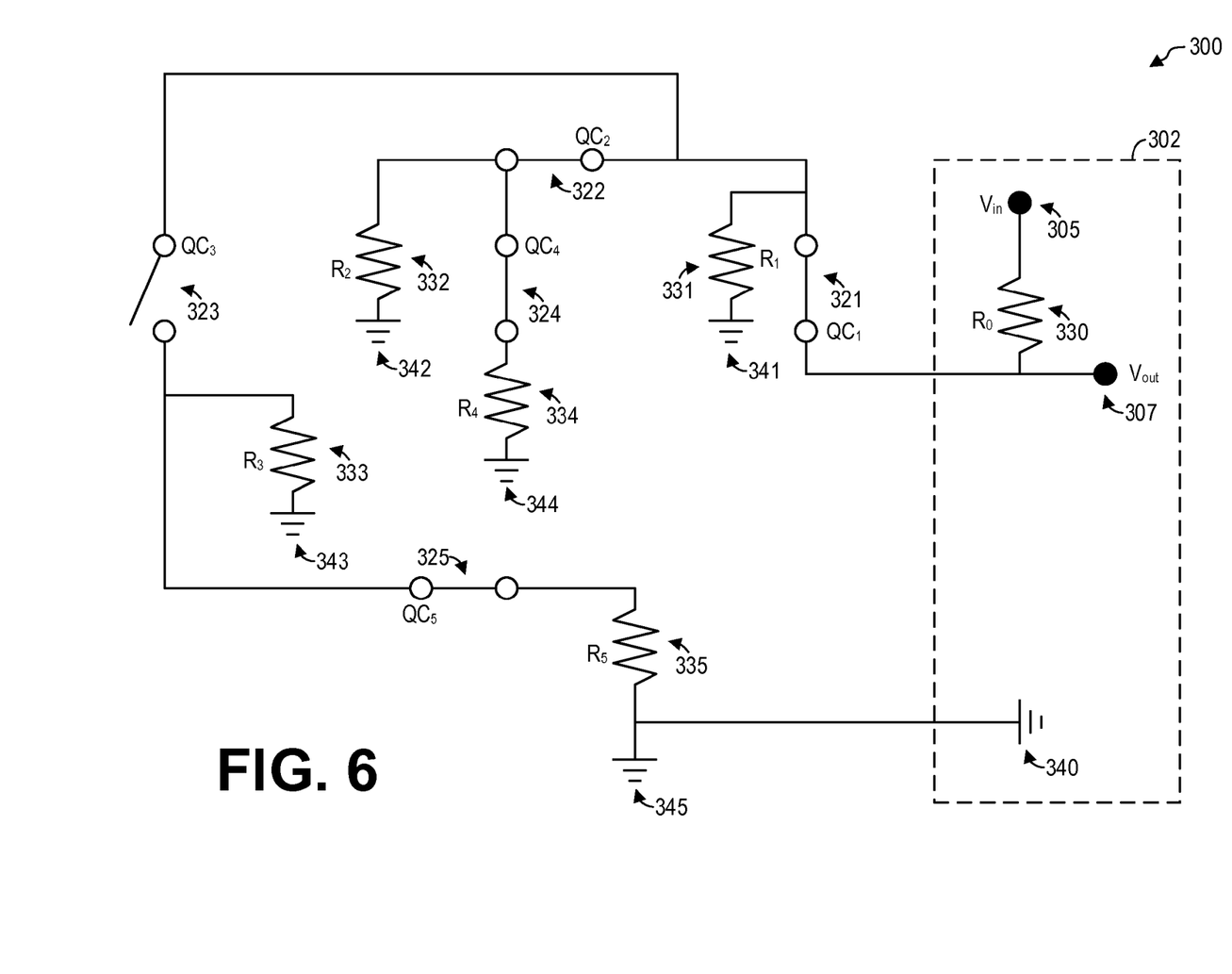
Figure 7:
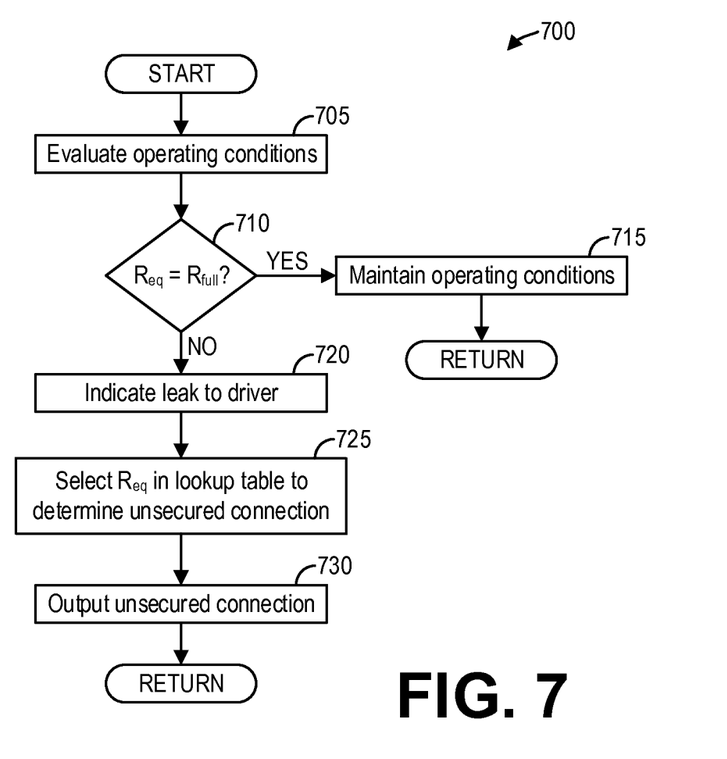
FIG. 7 shows a high-level flow chart illustrating an example method for detecting emissions leaks.

The following description relates to systems and methods for detecting leaks in an emissions control system of a vehicle. In particular, systems and methods are provided for detecting leaks in vapor line connections. In one non-limiting example, the emissions control system may be configured as illustrated in FIG. 1. Components of the emissions control system may be coupled via vapor lines, which include quick connect interfaces. A quick connect interface may include a force-sensing element and a resistor, thereby forming an interface circuit, as shown in FIG. 2. The force-sensing element functions as a switch that closes when sufficient force is applied to the force-sensing element. Multiple interface circuits may be arranged and electrically coupled to form a leak detection circuit, as shown in FIGS. 3-6. As shown in FIG. 7, a method for detecting a leak at one of the quick connect interfaces may include monitoring an equivalent resistance of the leak detection circuit. When one of the quick connect interfaces is not properly secured, the force-sensing element switches open and the resistor coupled to the force-sensing element is cut off from the leak detection circuit, thereby changing the equivalent resistance. In this way, the particular quick connect interface responsible for the leak can be detected.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

The fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. Vapors generated in fuel system 18 may be routed to an evaporative emissions control system 51, which includes a fuel vapor canister 22, via vapor recovery line 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent is activated charcoal. When purging conditions are met, such as when the canister is saturated, vapors stored in the fuel vapor canister 22 may be purged to engine intake 23 by opening a canister purge valve 61. While a single canister 22 is shown, it will be appreciated that fuel system 18 may include any number of canisters. In one example, the canister purge valve 61 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be the same as, or different from, the adsorbent in the canister 22 (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

One or more temperature sensors 32 may be coupled to and/or within canister 22. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Canister 22 includes a vent line 27 for routing gases out of the canister 22 to the atmosphere when storing, or trapping, fuel vapors from the fuel tank 20. Vent line 27 may also allow fresh air to be drawn into fuel vapor canister 22 when purging stored fuel vapors to engine intake 23 via purge line 28 and canister purge valve 61. While this example shows vent line 27 communicating with fresh, unheated air, various modifications may also be used. In some examples, vent line 27 may include an air filter 59 disposed therein upstream of the canister 22. Vent line 27 may include a canister vent valve 29 to adjust a flow of air and vapors between canister 22 and the atmosphere. The canister vent valve 29 may also be used for diagnostic routines. The canister vent valve 29 may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the canister vent valve 29 may be opened to allow a flow of fresh air to strip the fuel vapors stored in the canister. In one example, canister vent valve 29 may be a solenoid valve wherein opening or closing of the valve is performed via actuation of a canister vent solenoid. In particular, the canister vent valve may be an open valve that is closed upon actuation of the canister vent solenoid. By closing the canister vent valve, the fuel tank may be sealed from the atmosphere. In some embodiments, such as in hybrid-electric vehicles, fuel tank 20 may be coupled to canister 22 via a fuel tank isolation valve 52 within conduit 78. When included, the fuel tank isolation valve 52 (FTIV) may be closed to seal the fuel tank 20 from the atmosphere and may be opened to vent fuel tank vapors to canister 22.

Vapor recovery line 31 may be coupled to fuel tank 20 via one or more conduits 71, 73, and 75 and may include one or more valves for isolating the fuel tank during certain conditions. Further, in some examples, one or more fuel tank vent valves 87, 85, and 83 may be included in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include another grade vent valve (GVV) 83. Further, in some examples, recovery line 31 may be coupled to a fuel filler system 19. In some examples, fuel fill system 19 may include a fuel cap 55 for sealing off the fuel filler system 19 from the atmosphere. Refueling system 19 is coupled to fuel tank 20 via a fuel filler pipe or neck 11.

Further, refueling system 19 may include refueling lock 45. In some embodiments, refueling lock 45 may be a fuel cap locking mechanism or a filler pipe valve located at a mouth of fuel filler pipe 11 or a refueling door lock. The refueling lock 45 may be unlocked by commands from controller 12, for example, when a fuel tank pressure decreases below a pressure threshold or may be unlocked via a pressure gradient, for example, when a fuel tank pressure decreases to atmospheric pressure.

The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 20, the vent valves may be open or closed. For example, GVV 87 may be normally open allowing for diurnal and "running loss" vapors from the fuel tank to be released into canister 22, preventing over-pressurizing of the fuel tank. However, during vehicle operation on an incline, when a fuel level as indicated by fill level sensor or fuel level indicator 34 is artificially raised on one side of the fuel tank, GVV vent valve 87 may close to prevent liquid fuel from entering vapor line 31. As another example, FLVV 85 is normally open, however during fuel tank refilling, vent valve 85 may close, causing pressure to build in line 31 as well as at a filler nozzle coupled to the fuel pump. The increase in pressure at the filler nozzle may then trip the refueling pump, stopping the fuel fill process automatically, and preventing overfilling.

One or more temperature sensors may also be coupled to fuel system 18 for providing an estimate of a fuel system temperature. In one example, the fuel system temperature is a fuel tank temperature, wherein temperature sensor 84 is a fuel tank temperature sensor coupled to fuel tank 20. While the depicted example shows temperature sensor 84 directly coupled to fuel tank 20, in alternate embodiments, the temperature sensor may be coupled between the fuel tank 20 and canister 22.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open the canister vent valve 29 while closing canister purge valve 61 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open the canister vent valve 29, while maintaining the canister purge valve 61 closed, to depressurize the fuel tank before allowing fuel to be added therein.

As yet another example, the fuel system may be operated in a canister purging mode (e.g., after an emission control device light-off temperature has been attained and with the engine running), wherein the controller 12 may open the canister purge valve 61 and the canister vent valve 29. Herein, the vacuum generated by the intake manifold of the operating engine may be used to draw fresh air through vent line 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 12 may also be configured to intermittently perform leak detection routines on the fuel system 18 (e.g., fuel vapor recovery system) to confirm the integrity of the fuel system. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value).

In one example, to perform an engine-on leak test, negative pressure generated at engine intake 23 is applied on the fuel system by opening a canister purge valve 61 and closing a canister vent valve 29, for example, until a threshold level of fuel tank vacuum is reached. When included, the fuel tank isolation valve 52 (FTIV) may alternately be closed to seal the fuel tank 20 from the atmosphere. In other examples, an evaporative leak check module (ELCM) (not shown) may be coupled to the fuel system 18, for example, in vent line 27 between canister vent valve 29 and atmosphere. The ELCM may include a pressure generating means (e.g., a vacuum pump or a positive pressure pump), and may be connected to the fuel system via one or more actuatable valves, allowing for one or more sections of the fuel system to be isolated for leak testing. Once the target vacuum is reached, the canister purge valve 61 may be closed to discontinue application of vacuum to the fuel tank 20. Additionally, the canister vent valve 29 may be kept closed to isolate the fuel system. Based on a rate of pressure bleed-up (to atmospheric pressure) and a final stabilized fuel system pressure, the presence of a fuel system leak may be determined.

In alternate examples, the leak test may be a positive pressure leak test wherein a positive pressure (e.g., from an ELCM positive pressure pump) may be applied to the fuel tank until a threshold pressure level is reached. Based on a rate of pressure bleed-down to atmospheric pressure and a final stabilized fuel system pressure, the presence of a fuel system may be determined.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 37 located upstream of the emission control device, exhaust temperature sensor 33, fuel tank temperature sensor 84, fill level sensor 34, and fuel tank pressure sensor 91. Other sensors such as pressure, temperature, air/fuel ratio, vehicle motion, and composition sensors may be coupled to various locations in the vehicle system 6.

As another example, the actuators 81 coupled to control system 14 may include fuel injector 66, canister vent valve 29, fuel tank isolation valve 52 (when included), canister purge valve 61, throttle 62, and refueling lock 45. The control system 14 may include a controller 12. The controller 12 may receive input data from the various sensors 16, process the input data, and trigger the actuators 81 in response to the processed input data based on instruction or code programmed on memory therein corresponding to one or more routines. An example routine is shown with reference to FIG. 7.

The leak tests described herein above may detect leaks in the emissions control system 51, and some leak tests may locate leaks in specific components of the emissions control system 51, including but not limited to the canister purge valve 61, the canister vent valve 29, the fuel cap 55, and so on. By detecting and indicating leaks in specific components, such leak tests enable an automotive mechanic or technician to mitigate the leak by replacing or repairing the particular component responsible for the leak.

However, in some instances known leak tests may not be capable of pinpointing the exact location of a leak. For example, if the leak is located in one of the lines and conduits, including but not limited to vent line 27, purge line 28, vapor recovery line 31, conduit 78, and so on, then a leak test may simply indicate the presence of a leak in the emissions control system 51 without additional information such as the location of the leak. In such instances, an automotive mechanic or technician typically connects a smoke testing apparatus to the emissions control system 51 in order to locate the leak. When connected to the emissions control system 51, the smoke testing apparatus generates smoke which fills the emissions control system 51 and leaks out of any leak in the system. The automotive mechanic may then observe the smoke leaking out of the leak, and in this way may identify the location of a leak.

As discussed herein above, lines and conduits may couple components of the emissions control system 51. For example, the vent line 27 couples the fuel vapor canister 22 to the canister vent valve 29, the purge line 28 couples the fuel vapor canister 22 to the canister purge valve 61, the conduit 78 couples the fuel tank isolation valve 52 to the canister 22, and so on. Such lines and conduits may be referred to, collectively and individually, hereinafter as vapor lines. Vapor lines may include connection fittings comprising quick-connect fittings that may be joined without the use of tools. For example, quick-connect fittings may be snapped together and turned to lock the connection in place. In this way, separate components of the emissions control system 51 may be easily coupled and decoupled during manufacturing and maintenance of the vehicle.

If quick-connect fittings are not properly secured, or if the quick-connect fittings are degraded such that the connection of the quick-connect fittings is unsecured, leaks may occur through the unsecured connection. As a result, one or more of the leak tests described above may fail, indicating the presence of a leak in the system. Typically a smoke test, as described above, may be utilized to locate the presence of the leak. As described further herein, the quick-connect fittings may include force-sensing elements which detect the proper connection of the quick-connect fittings. A method to detect that the quick-connect fittings are properly secured may include monitoring the equivalent resistance of a circuit, where the circuit includes each of the force-sensing elements. Such a method, which is described further herein and with regard to FIG. 7, enables an automotive mechanic or technician to identify the source of a leak—at least when the source of the leak is an unsecured or degraded connection of quick-connect fittings—without the use of an expensive smoke testing apparatus and an intrusive smoke test.

FIG. 2 shows a perspective view of example vapor line connection elements 200 according to an embodiment. The vapor line connection elements 200 comprise quick-connect elements, including a first quick-connect element 205 and a second quick-connect element 215, that are mate-able with one another to connect one end of a vapor line 202 to one end of a vapor line 204. In particular, a protrusion 216 of the second quick-connect element 215 may be inserted into a receptacle 206 of the first quick-connect element 205 such that a surface 207 of the first quick-connect element 205 is in contact with a surface 217 of the second quick-connect element 215.

The vapor lines 202 and 204 may be coupled to components of an emissions control system, such that coupling the first quick-connect element 205 to the second quick-connect element 215 couples the components to which the vapor lines 202 and 204 are coupled. As a non-limiting and illustrative example, the vapor line 202 may be coupled to an inlet of a purge canister, such as canister 22 depicted in FIG. 1, while the vapor line 204 may be coupled to a valve, such as canister vent valve 29. In this example, mechanically coupling the first and second quick-connect elements 205 and 215 couples the canister to the valve.

At least one of the quick-connect elements 200 includes an interface circuit 220. The interface circuit 220 comprises a force-sensing element 222 which provides a switch closure when force is applied to it. The force-sensing element 222 may comprise, as a non-limiting example, a force-sensing or piezoelectric thin-film element. As depicted, the force-sensing element 222 is coupled to the surface 207 of the first quick-connect element 205.

Furthermore, the force-sensing element 222 may comprise an annular shape and may be coaxial with a longitudinal axis of the quick-connect elements. In one example, the force-sensing element 222 may cover at least a portion of the surface 207. In another example, the force-sensing element 222 may be integrated into at least a portion of the surface 207.

In this way, the force-sensing element 222 may be activated when the quick-connect elements 205 and 215 are properly connected such that the surfaces 207 and 217 are in full contact. In other words, the force-sensing element 222 may function as an electrical switch when force applied to the force-sensing element 222 by the surfaces 207 and 217 in contact with one another.

The particular force at which the force-sensing element 222 functions as an electrical switch may be selected such that the force-sensing element 222 sensing the particular force indicates that the quick-connect elements 205 and 215 are properly connected. As used herein, the phrase "properly connected" refers to a full connection of the first quick-connect element 205 to the second quick-connect element 215 such that no fluid within the conduits 202 and 204 may leak out from the quick-connect elements 200. In some examples, the quick-connect elements 200 may be properly connected when protrusion 216 is fully inserted into the receptacle 206. Additionally, the quick-connect elements 200 may be properly connected when at least one of the quick-connect elements 200 is rotated to lock the connection of the elements.

The interface circuit 220 may further comprise a resistor 224 electrically coupled in series to the force-sensing element 222 via an electrical wire 226. The electrical wire 226 may furthermore be electrically coupled to electrical ground 229. Although electrical ground 229 is depicted as positioned within conduit 202, electrical ground 229 may be positioned exterior to the conduit 202.

An electrical wire 227 may electrically couple the interface circuit 220 to one or more other interface circuits (not shown). Specifically, the electrical wire 227 may be electrically coupled to the force-sensing element 222.

An interface circuit 220 may be included at each vapor line connection in an emissions control system. As discussed above, each interface circuit in the emissions control system may be electrically coupled via electrical wire 227 and additional continuity wire. In this way, two or more interface circuits may be electrically coupled in series, in parallel, or in a combination of series and parallel to form a leak detection circuit. As discussed above, the force-sensing element 222 functions as a switch. Specifically, the force-sensing element 222 functions as an open switch responsive to a force below a threshold applied to the force-sensing element 222, and as a closed switch responsive to a force above the threshold applied to the force-sensing element 222. If two or more interface circuits are electrically coupled to form a leak detection circuit, a method for detecting a leaking vapor line connection may include evaluating an equivalent resistance of the leak detection circuit. Since each force-sensing element is connected in series to a resistor, the equivalent resistance of the leak detection circuit will change responsive to an inadequate force applied to at least one of the force-sensing elements, because the resistor connected to the force-sensing element will be electrically disconnected from the leak detection circuit. If each resistor in the leak detection circuit includes a different resistance from each other resistor, then the method can accurately locate the particular connection responsible for changing the equivalent resistance.

FIGS. 3-6 show a schematic diagram illustrating various states of an example leak detection circuit 300 according to an embodiment. For simplicity, and because each figure of FIGS. 3-6 depicts a different state of the same example leak detection circuit, like numeral references are repeated for like elements of the leak detection circuit. The example leak detection circuit 300 described herein includes five interface circuits, though it should be understood that a leak detection circuit may include more or fewer than five interface circuits without departing from the scope of this disclosure.

The leak detection circuit 300 includes a plurality of quick-connect (QC) elements arranged in parallel, wherein each QC element is electrically coupled in series with a resistor and ground. In particular, leak detection circuit 300 includes QC elements ($QC_1$ through $QC_5$) 321, 322, 323, 324, and 325, in addition to corresponding resistors ($R_1$ through $R_5$) 331, 332, 333, 334, and 335. Each of the resistors 331, 332, 333, 334, and 335 are connected to electrical grounds 341, 342, 343, 344, and 345. As discussed herein above with regard to FIG. 2, each QC element 321, 322, 323, 324, and 325 comprises a force-sensing element which functions as a switch. Furthermore, the combination of a QC element and a corresponding resistor, for example $QC_1$ 321 and resistor $R_1$ 331, as well as the ground 341 comprises an interface circuit. Each resistor includes a predetermined resistance unique from each other resistor. In this way, the equivalent resistance of the circuit 300 enables the controller 302 to determine the specific location of a leak.

In one example, controller 302 may be the engine controller 12. In an alternate example, controller 302 may be separate from yet in communication with engine controller 12. The controller 302 includes an input voltage $V_{in}$ 305 electrically coupled to an input resistor $R_0$ 330 and an output voltage $V_{out}$ 307. The input voltage $V_{in}$ 305 provides an input voltage, for example five volts, to the leak detection circuit 300. Furthermore, the controller 302 includes an electrical ground 340 electrically coupled to at least one of the resistors in the leak detection circuit. As depicted, the electrical ground 340 is coupled to the resistor $R_5$ 335, although it should be appreciated that the electrical ground 340 may be coupled to another resistor without departing from the scope of this disclosure.

Figure 3:
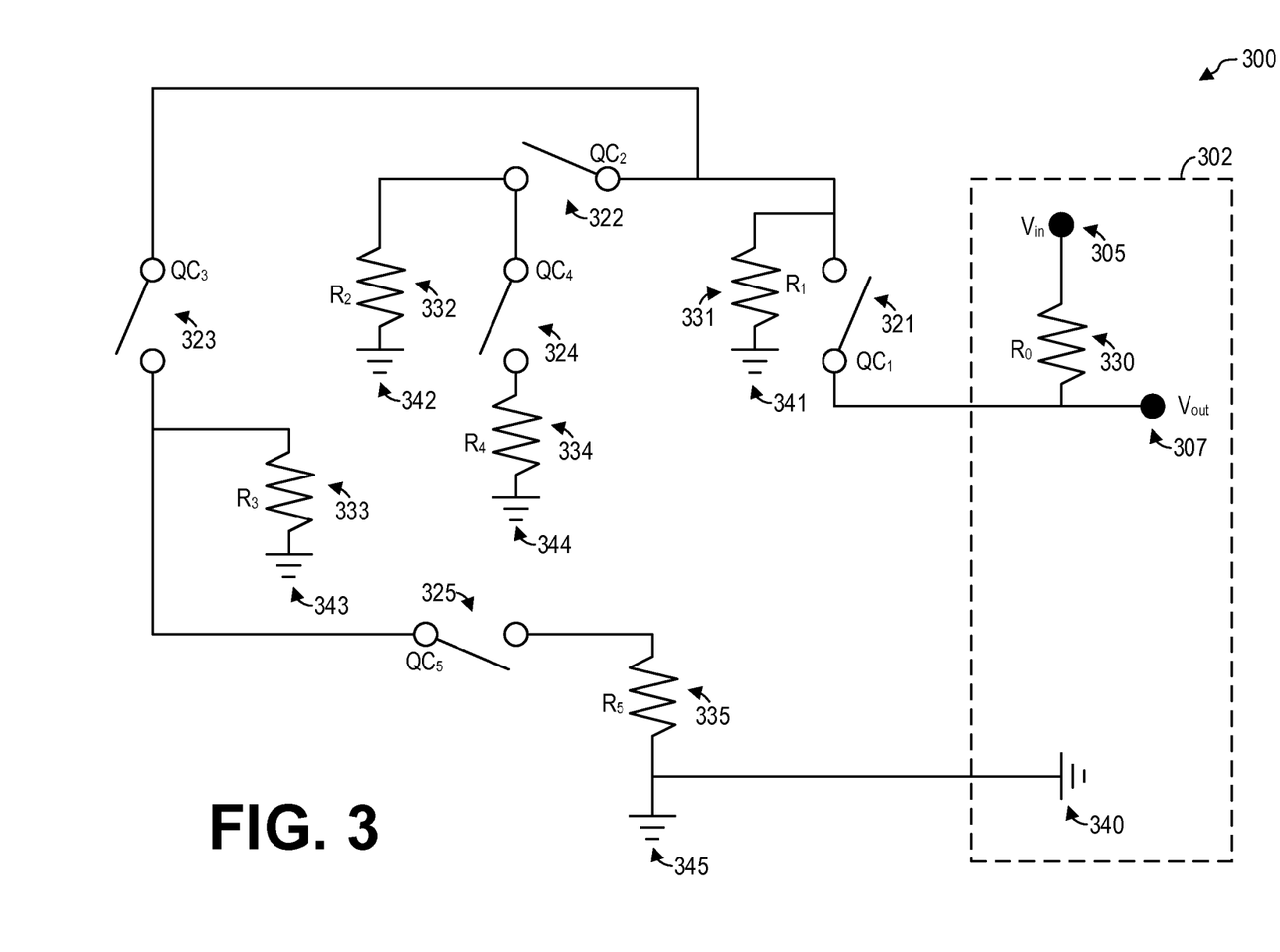
FIGS. 3-6 show schematic diagrams illustrating various states of an example leak detection circuit.

Referring now specifically to FIG. 3, the QC elements 321, 322, 323, 324, and 325 are open. As a result, current produced by the input voltage $V_{in}$ 305 does not flow through $QC_1$ 321 to the rest of the circuit, but rather flows through the input resistor $R_0$ 330 and to the output voltage $V_{out}$ 307. Thus, only a voltage drop across the input resistor $R_0$ 330 is detected at $V_{out}$ 307, and the equivalent resistance of the leak detection circuit 300 equals the resistance of input resistor $R_0$ 330.

Figure 4:
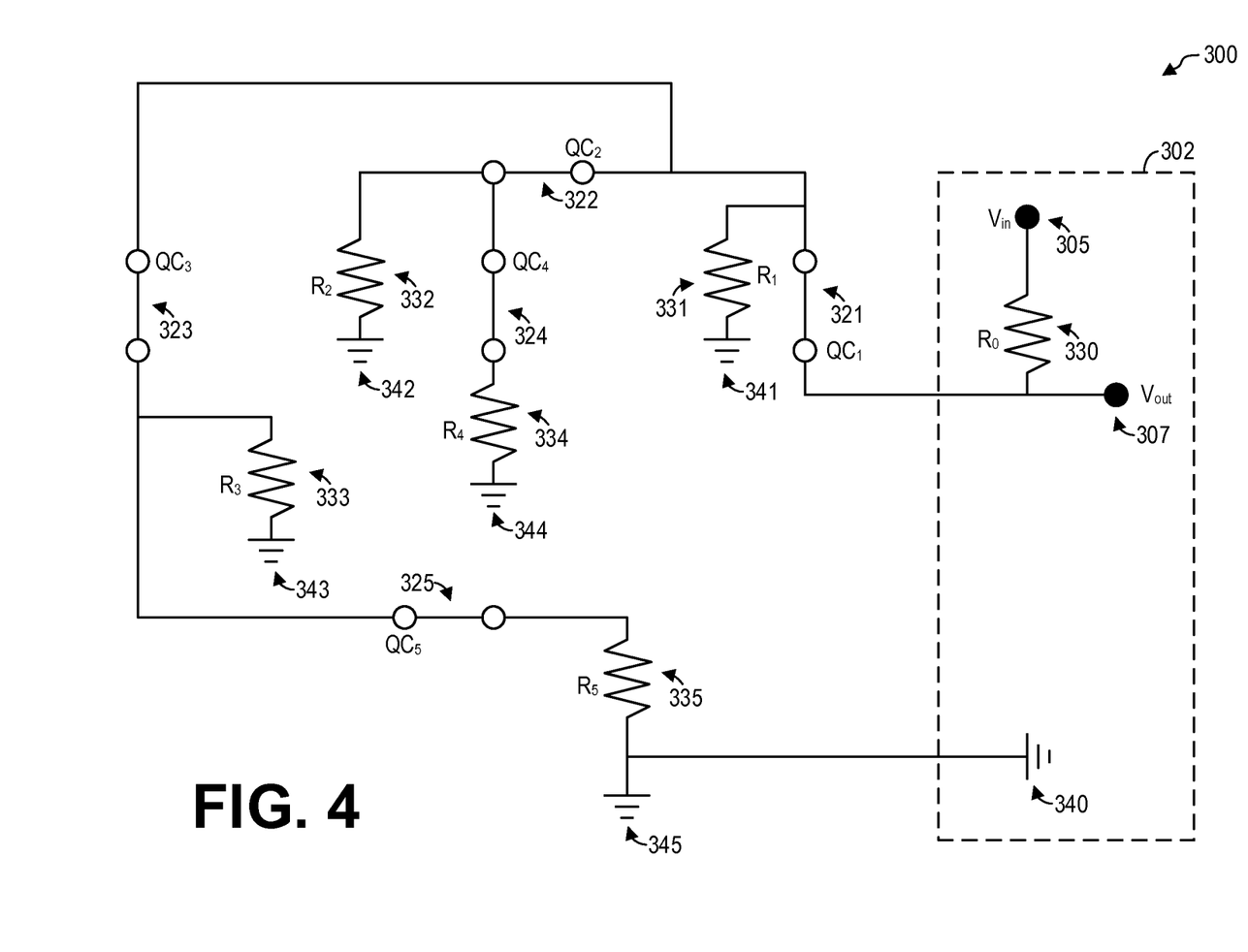

Referring now to FIG. 4, the QC elements 321, 322, 323, 324, and 325 are closed. Current produced by the input voltage Vin 305 flows through each circuit element, and so the equivalent resistance measured at $V_{out}$ 307 includes each resistor 330, 331, 332, 333, 334, and 335. Therefore, the equivalent resistance measured at $V_{out}$ 307 indicates no leaks due to unsecured quick-connect elements.

Figure 5:
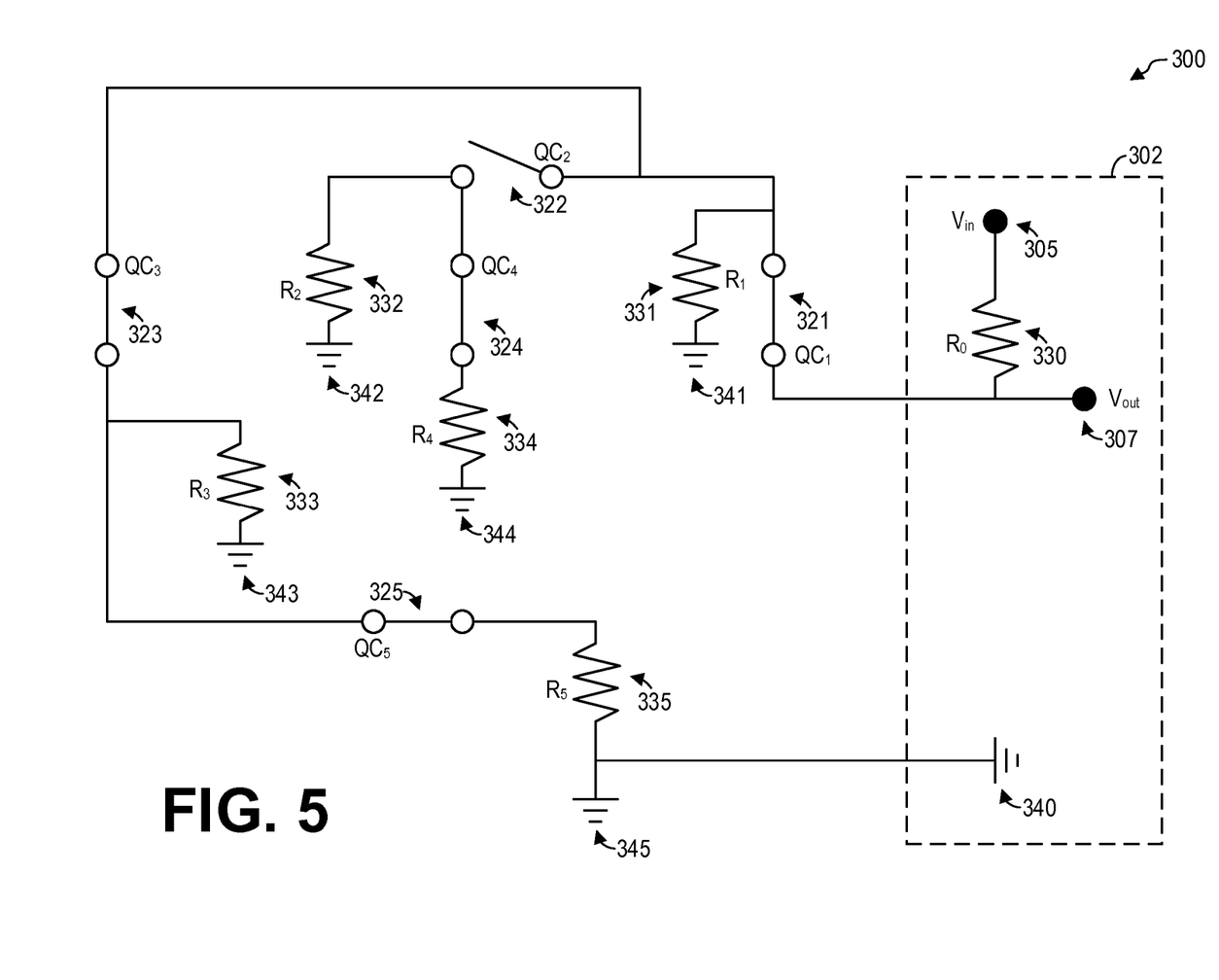

Referring now to FIG. 5, the QC elements 321, 323, 324, and 325 are closed and $QC_2$ 322 is open. Since $QC_2$ 322 is open, no current flows to the resistor $R_2$ 332. Furthermore, no current flows to $QC_4$ 324 or resistor $R_4$ 334. Thus, the equivalent resistance measured at $V_{out}$ 307 includes the resistors 331, 333, and 335. Since the equivalent resistance only includes the resistors 331, 333, and 335, the quivalent resistance indicates that $QC_2$ is open.

Thus, a method for diagnosing a leak in the quick-connect elements may include measuring an equivalent resistance of the leak detection circuit. The location of a leak may be determined by comparing the equivalent resistance to a lookup table. For example, considering the leak detection circuit 300, if the equivalent resistance only includes the input resistor R0 330, then $QC_1$ 321 is open. If the equivalent resistance includes the resistors $R_0$ 330, $R_1$ 331, $R_3$ 333, and $R_5$ 335, then $QC_2$ 322 is open. If the equivalent resistance includes the resistors $R_0$ 330, $R_1$ 331, $R_2$ 332, and $R_4$ 334, then $QC_3$ 323 is open. If the equivalent resistance includes the resistors $R_0$ 330, $R_1$ 331, $R_2$ 332, $R_3$ 333, and $R_5$ 335, then $QC_4$ 324 is open. If the equivalent resistance includes the resistors $R_0$ 330, $R_1$ 331, $R_2$ 332, $R_3$ 333, and $R_4$ 334, then $QC_5$ 325 is open. An example method for diagnosing a leak in the quick-connect elements is described further herein and with regard to FIG. 7.

The schematic diagram depicted in FIGS. 3-6 is exemplary, and one of ordinary skill in the art will readily appreciate that many variations of the circuit are possible. For example, while five QC elements are depicted, in some examples a number of QC elements other than five may be implemented. For example, more than five QC elements may be included in the leak detection circuit. As another example, fewer than five QC elements may be included in the leak detection circuit. Furthermore, the particular electrical arrangement of interface circuits, or combinations of QC elements and resistors, may differ from the arrangement depicted in FIGS. 3-6 without departing from the scope of this disclosure.

FIG. 7 shows a high-level flow chart illustrating an example method 700 for detecting an unsecured emissions line connection according to an embodiment. Instructions for carrying out method 700 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 700 begins at 705. At 705, method 700 may include evaluating operating conditions. Operating conditions may include, but are not limited to, an equivalent resistance of a leak detection circuit, such as the leak detection circuit 300 depicted in FIGS. 3-6. Operating conditions may be measured by one or more sensors coupled to the controller, or may be estimated or inferred based on the available data. For example, the equivalent resistance may be inferred based on voltage and/or current measured at $V_{out}$ 307. After evaluating operating conditions, method 700 proceeds to 710.

At 710, method 700 includes determining if the equivalent resistance of the leak detection circuit equals the full equivalent resistance. The full equivalent resistance comprises the equivalent resistance when each quick-connect element is properly secured. In other words, the full equivalent resistance includes each resistor of the leak detection circuit.

If the equivalent resistance $R_{eq}$ equals the full equivalent resistance $R_{full}$ ("YES"), then there are no connection leaks and method 700 proceeds to 715. At 715, method 700 includes maintaining operating conditions. Method 700 may then return.

However, if the equivalent resistance $R_{eq}$ does not equal the full equivalent resistance $R_{full}$ ("NO"), then method 700 proceeds to 720. At 720, method 700 includes indicating a leak to the driver or operator of the vehicle system. Indicating the leak to the driver may comprise activating a malfunction indicator lamp (MIL) positioned on a dashboard of the vehicle system. Other methods for indicating the leak may include displaying an alert on a display system positioned in the dashboard, playing an audio cue through audio speakers of the vehicle system, and so on. In this way, the driver can take action to mitigate the leak.

At 725, method 700 includes selecting the measured equivalent resistance $R_{eq}$ in a lookup table to determine the unsecured connection. The unsecured connection comprises the particular QC element which is not fully secured, such that insufficient force is applied to the QC element (and the force-sensing element therein) and the QC element functions as an open switch. The lookup table may include an equivalent resistance for each possible state of the leak detection circuit. For example, considering the leak detection circuit 300 depicted in FIGS. 3-6: if the equivalent resistance only includes R0, then $QC_1$ is unsecured; if the equivalent resistance includes $R_0$, $R_1$, $R_3$, and $R_5$, then $QC_2$ is unsecured; if the equivalent resistance includes $R_0$, $R_1$, $R_2$, and $R_4$, then $QC_3$ is unsecured; if the equivalent resistance includes $R_0$, $R_1$, $R_2$, $R_3$, and $R_4$, then $QC_4$ is unsecured; if the equivalent resistance includes $R_0$, $R_1$, $R_2$, $R_3$, and $R_4$, then $QC_5$ is unsecured; and if the equivalent resistance includes $R_0$, $R_1$, $R_2$, $R_3$, $R_4$, and $R_5$, then all QCs are secured. The particular equivalent resistance for each state depends on the arrangement of QCs and resistors, and may be calculated using Kirchhoff's circuit laws and/or inferred based on output current or voltage measured while the leak detection circuit is in a particular state.

At 730, method 700 includes outputting the unsecured connection determined at 725. For example, the unsecured connection may be saved in non-transitory memory of the controller for later retrieval, displayed on a display of the vehicle, and/or output to an automotive diagnostic tool. In this way, a mechanic or technician does not need to smoke test the emissions control system when a leak is detected as described herein, but instead may be informed of the location of the leak. Method 700 may then return.

In some examples, the method may further include adjusting operation of at least one element of the emissions control system responsive to indicating the leak. For example, adjusting operation of the at least one element of the emissions control system comprises closing a valve to isolate the leak. In some examples, adjusting operation of the at least one element is based on a location of the leak. For example, if the method determines that a quick-connect element coupling the canister and the canister vent valve is unsecured, a valve within the canister may be closed to prevent vapor from entering the unsecured vapor line. In this way, emissions may be reduced, at least temporarily, in the presence of a leak.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

The technical effect of the disclosure may include a detection of a leak at a connection interface. Another technical effect of the disclosure may include the indication, to a driver, of a leak in an emissions control system. Yet another technical effect of the disclosure may include the monitoring of an equivalent resistance of a leak detection circuit. Another technical effect of the disclosure may include providing an alert of a leak to a driver based on an equivalent resistance of a leak detection circuit. Another technical effect of the disclosure is the reduction of emissions due to a leak.

As one embodiment, a method for an emissions control system comprises monitoring an equivalent resistance of a leak detection circuit, and indicating a leak responsive to the equivalent resistance not equal to a threshold resistance. In one example, the method further comprises indicating a location of the leak based on the equivalent resistance. As an example, the method further comprises comparing the equivalent resistance to a lookup table to determine the location of the leak.

In one example, the leak detection circuit comprises at least two force-sensing elements, including a first force-sensing element and a second force-sensing element. The leak detection circuit further comprises a first resistor electrically coupled to the first force-sensing element and a second resistor electrically coupled to the second force-sensing element. Resistance of the first resistor differs from resistance of the second resistor.

In another example, the first force-sensing element is physically coupled to a first quick-connect interface and the second force-sensing element is physically coupled to a second quick-connect interface.

In yet another example, indicating the leak comprises activating a malfunction indicator lamp. As another example, indicating the leak comprises displaying an alert on a vehicle display.

In another example, the method further comprises adjusting operation of at least one element of the emissions control system responsive to indicating the leak. For example, adjusting operation of the at least one element of the emissions control system comprises closing a valve to isolate the leak. In some examples, adjusting operation of the at least one element is based on a location of the leak.

In another representation, a connector assembly comprises: a first connector comprising a housing defining a protruded portion and a first interface; a second connector comprising a housing defining a cavity and a second interface, the second connector matable with the first connector wherein the cavity receives the protruded portion and the first interface contacts the second interface; an electrical force-sensing element positioned on and substantially covering one of the first interface and the second interface; and an electrical resistor integrally formed in the housing and electrically coupled in series to electrical ground and to the electrical force-sensing element.

In one example, the connector assembly further comprises an electrical wire integrally formed in the housing and electrically coupled to the electrical force-sensing element, the electrical wire configured to provide current to the electrical force-sensing element. The current flows through the electrical force-sensing element to the electrical resistor responsive to the first interface in contact with the second interface such that a threshold force is applied to the electrical force-sensing element.

In yet another embodiment, an evaporative emissions system comprises at least two quick-connect interfaces configured to couple together elements of the evaporative emissions system, each quick-connect interface comprising a force-sensing element configured to output a unique signal upon forming a seal.

In one example, the system further comprises a controller configured with instructions stored in non-transitory memory therein which when executed cause the controller to: monitor the unique signal from each quick-connect interface; and indicate a leak in the emissions control system responsive to at least one of the unique signals not output. In another example, the force-sensing elements are electrically coupled to form a circuit, and monitoring the unique signal from each quick-connect interface comprises monitoring an output voltage of the circuit. Monitoring the output voltage of the circuit comprises comparing the output voltage to a lookup table stored in the non-transitory memory.

In another example, the elements of the emissions control system includes one or more of a carbon canister, a canister vent valve, and canister purge valve, a fuel tank isolation valve, a fuel tank vent valve, and a fuel fill system.

In yet another example, each quick-connect interface further comprises a resistor electrically coupled to the force-sensing element.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an emissions control system, comprising:
monitoring an equivalent resistance of a leak detection circuit;
indicating a leak responsive to the equivalent resistance not equal to a threshold resistance; and
indicating a location of the leak based on the equivalent resistance.

2. The method of claim 1, further comprising comparing the equivalent resistance to a lookup table to determine the location of the leak.

3. The method of claim 1, wherein the leak detection circuit comprises at least two force-sensing elements, including a first force-sensing element and a second force-sensing element.

4. The method of claim 3, wherein the leak detection circuit further comprises a first resistor electrically coupled to the first force-sensing element and a second resistor electrically coupled to the second force-sensing element.

5. The method of claim 4, wherein resistance of the first resistor differs from resistance of the second resistor.

6. The method of claim 3, wherein the first force-sensing element is physically coupled to a first quick-connect interface and the second force-sensing element is physically coupled to a second quick-connect interface.

7. The method of claim 1, wherein indicating the leak comprises activating a malfunction indicator lamp.

8. The method of claim 1, further comprising adjusting operation of at least one element of the emissions control system responsive to indicating the leak.

9. The method of claim 8, wherein adjusting operation of the at least one element of the emissions control system comprises closing a valve to isolate the leak.

10. The method of claim 8, wherein adjusting operation of the at least one element of the emissions control system is based on the location of the leak.

11. A connector assembly, comprising:
a first connector comprising a housing defining a protruded portion and a first interface;
a second connector comprising a housing defining a cavity and a second interface, the second connector matable with the first connector wherein the cavity receives the protruded portion and the first interface contacts the second interface;
an electrical force-sensing element positioned on and substantially covering one of the first interface and the second interface; and
an electrical resistor integrally formed in the housing and electrically coupled in series to electrical ground and to the electrical force-sensing element.

12. The connector assembly of claim 11, further comprising an electrical wire integrally formed in the housing and electrically coupled to the electrical force-sensing element, the electrical wire configured to provide current to the electrical force-sensing element.

13. The connector assembly of claim 12, wherein the current flows through the electrical force-sensing element to the electrical resistor responsive to the first interface in contact with the second interface such that a threshold force is applied to the electrical force-sensing element.

14. An evaporative emissions system, comprising:
at least two quick-connect elements configured to couple together elements of the evaporative emissions system, wherein at least one quick-connect element of the at least two quick-connect elements comprises a force-sensing element positioned on and substantially covering an interface of the at least one quick-connect element, the force-sensing element configured to output a unique signal upon forming a seal, wherein the interface of the at least one quick-connect element is in face-sharing contact with an interface of another quick-connect element upon the forming of the seal.

15. The system of claim 14, further comprising a controller configured with instructions stored in non-transitory memory therein which when executed cause the controller to:
monitor the unique signal from each quick-connect element;
indicate a leak in the evaporative emissions system responsive to at least one of the unique signals not output; and
indicate a location of the leak based on the at least one of the unique signals not output.

16. The system of claim 15, wherein the force-sensing elements are electrically coupled to form a circuit, and wherein monitoring the unique signal from each quick-connect element comprises monitoring an output voltage of the circuit.

17. The system of claim 16, wherein monitoring the output voltage of the circuit comprises comparing the output voltage to a lookup table stored in the non-transitory memory.

18. The system of claim 14, wherein the elements of the evaporative emissions system includes one or more of a carbon canister, a canister vent valve, a canister purge valve, a fuel tank isolation valve, a fuel tank vent valve, and a fuel fill system.

19. The system of claim 14, wherein the at least one quick-connect element further comprises a resistor electrically coupled in series to electrical ground and to the force-sensing element.

* * * * *